United States Patent
Wilson et al.

(10) Patent No.: US 12,436,386 B2
(45) Date of Patent: Oct. 7, 2025

(54) HEAD WEARABLE DISPLAY DEVICE WITH IMAGE MONITORING COMPRISING AT LEAST ONE IMAGE MONITOR SENSOR OPTICALLY COUPLED TO A WAVEGUIDE

(71) Applicant: Rockwell Collins, Inc., Cedar Rapids, IA (US)

(72) Inventors: Brandon E. Wilson, Portland, OR (US); Christopher M. Boggs, Gainesville, VA (US); William T. Kirchner, Ashburn, VA (US); Eric P. Stratton, Portland, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 627 days.

(21) Appl. No.: 17/847,757

(22) Filed: Jun. 23, 2022

(65) Prior Publication Data
US 2023/0418055 A1   Dec. 28, 2023

(51) Int. Cl.
*G02B 27/01* (2006.01)
*G02B 6/10* (2006.01)

(52) U.S. Cl.
CPC .......... *G02B 27/0101* (2013.01); *G02B 6/10* (2013.01); *G02B 27/0172* (2013.01); *G02B 2027/0116* (2013.01); *G02B 2027/0138* (2013.01); *G02B 2027/014* (2013.01)

(58) Field of Classification Search
CPC .................... G02B 2027/0116; G09G 2380/12
See application file for complete search history.

(56) References Cited

U.S. PATENT DOCUMENTS

| 9,766,465 B1 | 9/2017 | Tiana et al. |
| 10,109,054 B1 * | 10/2018 | Wilson ............... G02B 27/0172 |
| 10,198,978 B2 | 2/2019 | Richards et al. |

(Continued)

FOREIGN PATENT DOCUMENTS

| CN | 109997174 A | * | 7/2019 | ........... A61B 5/0075 |
| CN | 110660036 A | * | 1/2020 | |

(Continued)

OTHER PUBLICATIONS

Extended European Search Report dated Nov. 7, 2023; European Application No. 23179899.2.

*Primary Examiner* — Paul C Lee
(74) *Attorney, Agent, or Firm* — Suiter Swantz IP (57) ABSTRACT

A system includes a head wearable display (HWD) device and a processor. The HWD device includes a waveguide display and an image monitor sensor. The waveguide display includes a waveguide and an optical system, the optical system configured to: receive image data corresponding to an image; and project the image at least through the waveguide to be displayed to a user. The image monitor sensor is optically coupled to the waveguide or the optical system. The image monitor sensor is configured to: capture at least a portion of the image as a monitored image; and output monitored image data. The processor is configured to: receive the monitored image data from the image monitor sensor; and based at least on the monitored image data, determine whether the waveguide display displayed the image correctly.

20 Claims, 9 Drawing Sheets

(56) References Cited

U.S. PATENT DOCUMENTS

| | | |
|---|---|---|
| 2018/0098056 A1 | 4/2018 | Bohn et al. |
| 2019/0129177 A1 | 5/2019 | Roimi et al. |
| 2020/0349874 A1 | 11/2020 | Mills et al. |
| 2022/0092747 A1 | 3/2022 | Edwin et al. |

FOREIGN PATENT DOCUMENTS

| | | | |
|---|---|---|---|
| GB | 2568296 A | | 5/2019 |
| JP | 2016051358 A | * | 4/2016 |
| TW | 201908817 A | | 3/2019 |
| WO | 2020176240 A1 | | 9/2020 |

* cited by examiner

HEAD WEARABLE DISPLAY DEVICE WITH IMAGE MONITORING COMPRISING AT LEAST ONE IMAGE MONITOR SENSOR OPTICALLY COUPLED TO A WAVEGUIDE

BACKGROUND

Commercial-off-the-shelf (COTS) devices are frequently used in avionics products due to the high cost of custom devices, but use of such COTS devices is typically challenging due to the system integrity required to mitigate aviation hazards. COTS devices are frequently used to some extent in commercial aviation products in order to be competitive in the marketplace. However, it is inherently difficult to substantiate compliance with Hazardous and Catastrophic aviation hazards when COTS devices are used, because they lack formal DO-254 design assurance evidence.

Head wearable display (HWD) devices, such as and helmet mounted display (HMD) devices, face challenges related to the use of COTS devices; however, the implementation challenges for monitoring schemes are significant due to the small size and tight integration of head worn components. If future HWDs with COTS components include flight guidance symbology such as the AIII mode used for Category III landing credit and/or vision systems enabling low visibility operations, or if such HWDs are used in single pilot operations (SPO), some form of display path monitoring would likely be required. However, currently, there is no monitoring solution for such HWDs.

SUMMARY

In one aspect, embodiments of the inventive concepts disclosed herein are directed to a system. The system may include a head wearable display device and at least one processor. The head wearable display device may include a waveguide display and at least one image monitor sensor. The waveguide display may be implemented at least one of in or on the head wearable display device. The waveguide display may include a waveguide and an optical system, the optical system configured to: receive image data corresponding to an image; and project the image at least through the waveguide to be displayed to a user. Each of the at least one image monitor sensor may be implemented in or on the head wearable display device. Each of the at least one image monitor sensor may be optically coupled to the waveguide or the optical system of the waveguide display. Each of the at least one image monitor sensor may be configured to: capture at least a portion of the image as a monitored image; and output monitored image data corresponding to the monitored image. Each of the at least one processor may be implemented in the head wearable display device or in a computing device separate from the head wearable display device. The at least one processor may be configured to: receive the monitored image data from each of the at least one image monitor sensor; and based at least on the monitored image data, determine whether the waveguide display displayed the image correctly.

In a further aspect, embodiments of the inventive concepts disclosed herein are directed to a method. The method may include: providing a waveguide display of a head wearable display device, the waveguide display implemented at least one of in or on the head wearable display device, the waveguide display comprising a waveguide and an optical system; receiving, by the optical system, image data corresponding to an image; projecting, by the optical system, the image at least through the waveguide to be displayed to a user; providing at least one image monitor sensor of the head wearable display device, each of the at least one image monitor sensor implemented in or on the head wearable display device, each of the at least one image monitor sensor optically coupled to the waveguide or the optical system of the waveguide display; capturing, by each of the at least one image monitor sensor, at least a portion of the image as a monitored image; outputting, by each of the at least one image monitor sensor, monitored image data corresponding to the monitored image; providing at least one processor, each of the at least one processor implemented in the head wearable display device or in a computing device separate from the head wearable display device; receiving, by the at least one processor, the monitored image data from each of the at least one image monitor sensor; and based at least on the monitored image data, determining, by the at least one processor, whether the waveguide display displayed the image correctly.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a head wearable device having a waveguide display and an image monitor sensor (e.g., a camera or a photodiode).

HWD display devices, such as glasses HWD display devices or HMD display devices, are very small and tightly packaged with other optical elements due to the size and weight requirements of head worn technology. Further complicating this challenge is the desire to use COTS technology with minimal customization to limit development costs to a competitive level. Therefore, an external monitoring solution is highly desirable as compared to multiple discrete, embedded monitors used for head-up display (HUD) monitoring schemes.

Many common near-eye display devices on the market employ optical waveguide technology to translate an image from projection optics to a viewing region in front of an eye. In addition to translating the image to a location for viewing, the waveguide has a unique feature that enlarges the image to an appropriate size for viewing, enabling the use of much smaller projection and display components. A monitoring concept of some embodiments relies on a feature in many waveguide optical systems which presents a "pre-expanded" and collimated image at a location that can be captured by a small image monitor sensor, such as a small camera or photodiode(s).

Figure 1:
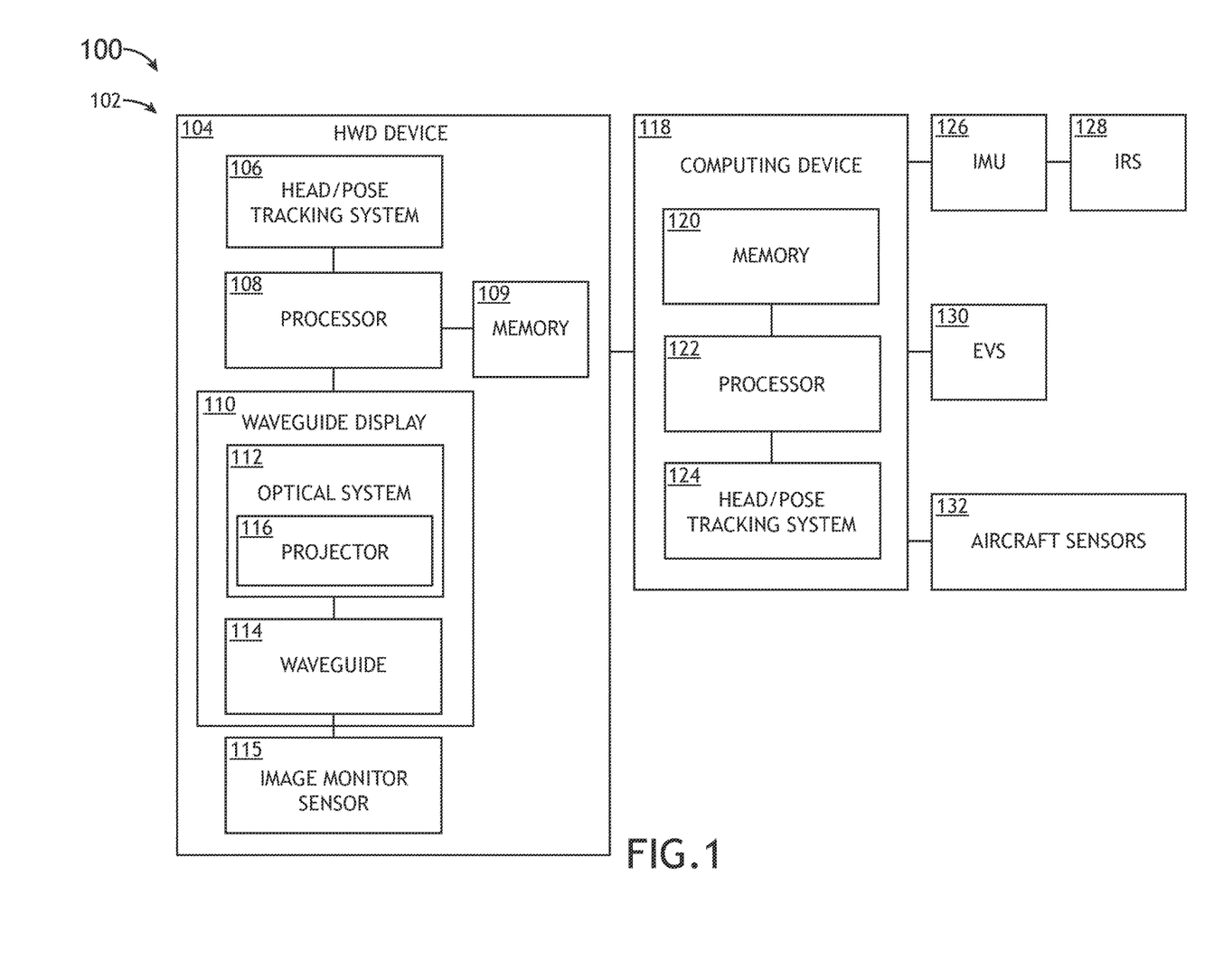
FIG. 1 is a view of an exemplary embodiment of a system including a head wearable display (HWD) device according to the inventive concepts disclosed herein.

Referring now to FIGS. 1, 2, 3, 4, 5, 6A, 6B, 7, and 8, an exemplary embodiment of a system 100 according to the inventive concepts disclosed herein is depicted. The system 100 may be implemented as any suitable system, such as at least one vehicle (e.g., an aircraft 102). For example, as shown in FIG. 1, the system 100 may include an aircraft 102. For example, the aircraft 102 may include an aircraft cockpit 200, at least one HWD device 104, at least one computing device 118, at least one inertial measurement unit (IMU) 126, at least one inertial reference system (IRS) 128, optionally at least one enhanced vision system (EVS) 130, and aircraft sensors 132, some or all of which may be communicatively coupled at any given time.

In some embodiments, the HWD device 104 may include at least one head and/or pose tracking system 106, at least one processor 108, at least one memory device 109, at least one waveguide display 110, and/or at least one image monitor sensor 115 (e.g., a camera or a photodiode(s)), some or all of which may be optically and/or communicatively coupled at any given time. For example, the waveguide display 110 may include at least one optical system 112, at least one waveguide 114, and/or the at least one image monitor sensor 115, some or all of which may be optically and/or communicatively coupled at any given time. In some embodiments, the HWD device 104 may be in the aircraft cockpit 200.

Figure 2:
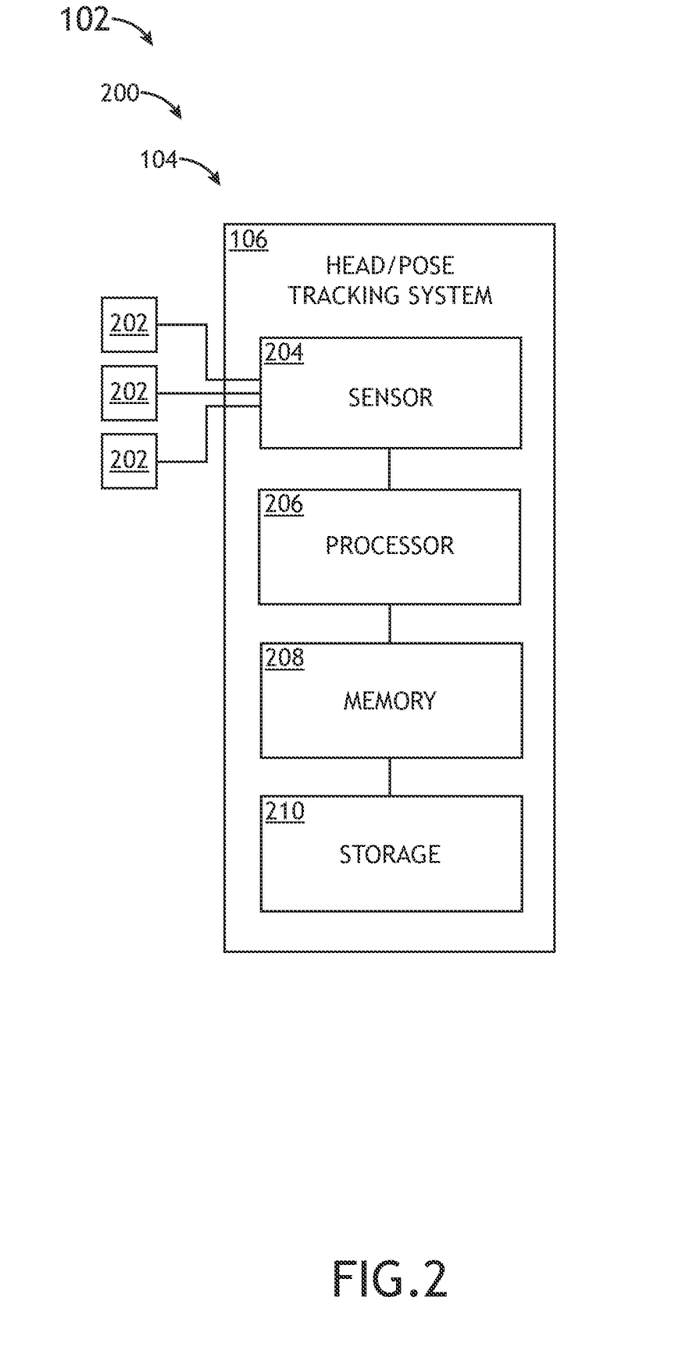
FIG. 2 is a view of the head and/or pose tracking system of the HWD device of FIG. 1 according to the inventive concepts disclosed herein.

The head and/or pose tracking system 106 may have optical, magnetic, and/or inertial tracking capability. In some embodiments, the head and/or pose tracking system 106 may include head and/or pose tracking capabilities and/or be coordinated with head and/or pose tracking capabilities of another head and/or pose tracking system (e.g., 124), for example, such that the head and/or pose tracking operations are relative to a position and/or orientation of a user and/or relative to a position and/or orientation to a vehicle (e.g., the aircraft 102). For example, the head and/or pose tracking system 106 may be configured to track the Line of Sight (LOS) of the waveguide display 110 optical system. For example, if the waveguide display 110 is mounted to the HWD device 104, this direction may be a direction that a head is pointing that is being tracked. The head and/or pose tracking system 106 may include at least one sensor 204 (e.g., a camera configured to capture locations of cockpit reference fiducials 202), at least one processor 206, at least one memory device 208, and/or at least one storage device 210 (e.g., at least one non-volatile storage device), as well as other components, equipment, and/or devices commonly included in a head and/or pose tracking system, some or all of which may be communicatively coupled at any time, as shown in FIG. 2. The at least one processor 206 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout. The at least one sensor 204 may be at least one optical sensor (e.g., an optical infrared sensor (e.g., an infrared camera) configured to detect infrared light emitted and/or reflected from the fiducials 202), at least one magnetic sensor, and/or at least one inertial sensor. The head and/or pose tracking system 106 may be configured to determine and track a position and an orientation of a user's head relative to an environment (e.g., a cockpit 200). The head and/or pose tracking system 106 may be configured for performing fully automatic head and/or pose tracking operations in real time. The processor 206 of the head and/or pose tracking system 106 may be configured to process data received from the sensors 204 and output processed data (e.g., head and/or pose tracking data) to one of the computing devices of the system 100 and/or the processor 108 for use in generating images aligned with the user's field of view, such as augmented reality or virtual reality images aligned with the user's field of view to be displayed by the waveguide display 110. For example, the processor 206 may be configured to determine and track a position and orientation of a user's head relative to an environment (e.g., a cockpit 200). Additionally, for example, the processor 206 may be configured to generate position and orientation data associated with such determined information and output the generated position and orientation data. The processor 206 may be configured to run various software applications or computer code stored in a non-transitory computer-readable medium (e.g., memory 208 and/or storage device 210) and configured to execute various instructions or operations. In some embodiments, the at least one processor 206 may be implemented as a special purpose processor configured to execute instructions for performing (e.g., collectively performing if more than one processor) any or all of the operations disclosed throughout.

The at least one processor 108 may be implemented as any suitable processor(s), such as at least one general purpose processor, at least one central processing unit (CPU), at least one image processor, at least one graphics processing unit (GPU), and/or at least one special purpose processor configured to execute instructions for performing (e.g., collectively performing if more than one processor) any or all of the operations disclosed throughout. In some embodiments, the processor 108 may be communicatively coupled to the waveguide display 110. For example, the processor 108 may be configured to: receive head and/or pose system tracking data; receive image data from the computing device 118; generate and/or output image data to the waveguide display 110 and/or to the optical system 112, for example, based on and/or the head and/or pose tracking system data; generate and/or output augmented reality and/or virtual reality image data to waveguide display 110 and/or the optical system 112, for example, based on and/or the head and/or pose tracking system data; and/or generate and/or output other image data, which may include vehicle operation (e.g., aircraft) information, symbology, navigation information, tactical information, and/or sensor information to the waveguide display 110 and/or the optical system 112, for example, based on the head and/or pose tracking system data.

For example, the processor 108 may be configured to: receive the monitored image data from each of the at least one image monitor sensor 115; and/or based at least on the monitored image data, determine whether the waveguide display 110 displayed the image correctly.

For example, the processor 108 may be configured to: obtain the image data corresponding to the image; compare the monitored image of each of the at least one image monitor sensor 115 against the image; and/or based at least on the comparison of the monitored image of each of the at least one image monitor sensor against the image, determine whether the given waveguide display 110 displayed the image correctly.

For example, the processor 108 may be configured to: based at least on the monitored image data, determine that the waveguide display 110 displayed the image incorrectly. For example, the processor 108 may be configured to: based at least on the monitored image data, determine that the waveguide display 110 displayed the image as a flipped image or a frozen image. For example, the processor 108 may be configured to: based at least on the monitored image data, determine that the waveguide display 110 displayed the image brighter than a predetermined maximum brightness threshold or less bright than a predetermined minimum brightness threshold. For example, the processor 108 may be configured to: based at least on the monitored image data, determine that the waveguide display 110 displayed the image with incorrectly positioned symbology, incorrect symbology, or missing symbology. For example, the processor 108 may be configured to: based at least on the monitored image data, determine that the waveguide display 110 displayed image content of the image incorrectly. For example, the processor 108 may be configured to: based at least on the determination that the waveguide display 110 displayed the image incorrectly, disable the given waveguide display 110. For example, the processor 108 may be configured to: determine whether at least one of the monitored image of each of the a least one image monitor sensor 115 is aligned with a field of view of the user.

For example, the processor 108 may be configured to: compare the monitored image data against the second waveguide monitored image; and based at least on the comparison of the monitored image data against the second waveguide monitored image data, determine whether one of the waveguide display 110 or the second waveguide display 110 displayed the image incorrectly.

The waveguide display 110 may be implemented as any suitable waveguide display. The waveguide display 110 may be implemented in or on the head wearable display device 104. The waveguide display 110 may include the at least one optical system 112 and/or at least one waveguide 114. For example, the optical system 112 may include at least one processor, at least one collimator, and/or at least projector 116. The optical system 112 may be configured to: receive image data corresponding to an image; and/or project images at least through the waveguide 114 to be displayed to the user. In some embodiments, the waveguide 116 may be a diffractive, mirror, or beam splitter based waveguide. In some embodiments, the waveguide display 111 may include at least one lens, at least one mirror, diffraction gratings, at least one polarization sensitive component, at least one beam splitter, at least one waveguide 114, at least one light pipe, at least one window, and/or the projector 116.

The optical system 112 may be configured to receive image data from the processor 108 and project images through the waveguide 114 for display to the user.

Each of the at least one image monitor sensor 115 may be any suitable image sensor, such as a camera, transparent imager, or a photodiode(s). Each of the at least one image monitor sensor 115 may be implemented in or on the head wearable display device. Each of the at least one image monitor sensor 115 may be optically coupled to the waveguide 114 and/or the optical system 112 of the waveguide display 110. Each of the at least one image monitor sensor 115 may be configured to: capture at least a portion of the image as a monitored image; and/or output monitored image data corresponding to the monitored image.

In some embodiments, a given image monitor sensor 115 may be optically coupled to the waveguide 114 at a position on the waveguide 114 above a user-viewable portion of the waveguide 114, wherein the given image monitor sensor 115 is configured to capture at least the at least the portion of the image emitted from the position on the waveguide 114 above the user-viewable portion of the waveguide 114.

Figure 7:
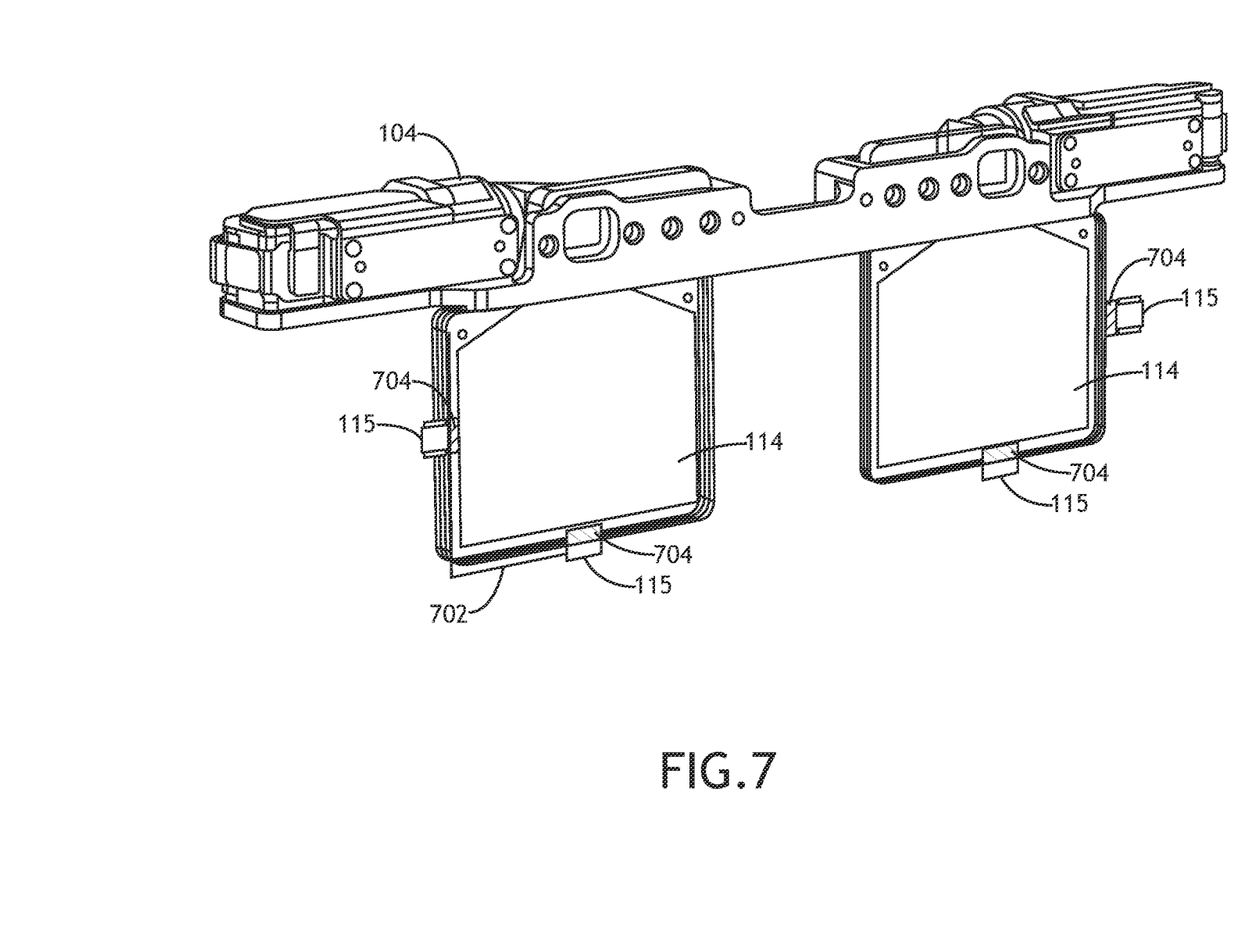
FIG. 7 is a view of an exemplary embodiment of the HWD device of FIG. 1 according to the inventive concepts disclosed herein.

In some embodiments, a given image monitor sensor 115 may be optically coupled to the waveguide 114 at a position along a side edge 506 or a bottom edge 504 of the waveguide. For example, the waveguide 114 may include an output grating 704 between the given image monitor sensor 115 and the side edge 506 or the bottom edge 506 of the waveguide 114, for example, to reduce chromatic aberration in the monitored image.

In some embodiments, the head wearable display device 104 may include a second waveguide display 110 including a second waveguide 114 and a second optical system 112, wherein the second optical system 112 is configured to: receive the image data corresponding to the image and project the image at least through the second waveguide to be displayed to the user. In some embodiments, the waveguide display 110 is one of a left eye waveguide display or a right eye waveguide display, wherein the second waveguide display 110 is another of the left eye waveguide display or the right eye waveguide display. In some embodiments, the head wearable display device 104 further includes at least one second image monitor sensor 115, each of the at least one second image monitor sensor 115 optically coupled to the second waveguide 114 or the second optical system 112 of the second waveguide display 110, each of the at least one second image monitor sensor 115 configured to: capture at least a portion of the image as a second waveguide monitored image and output second waveguide monitored image data corresponding to the second waveguide monitored image. In some embodiments, the at least one processor (e.g., 108 and/or 122) may be further configured to: compare the monitored image data against the second waveguide monitored image; and based at least on the comparison of the monitored image data against the second waveguide monitored image data, determine whether one of the waveguide display 110 or the second waveguide display 110 displayed the image incorrectly.

In some embodiments, the at least one image monitor sensor 115 includes two image monitor sensors 115, wherein each of the two image monitor sensors are positioned at different locations on the waveguide 114. For example, each of the two image monitor sensors 115 may be configured to capture different portions of the image.

The computing device 118 may be implemented as any suitable computing device, such as an avionics computing device. The computing device 118 may include at least one memory 120, at least one processor 122, and/or at least one head and/or pose tracking system 124, some or all of which may be communicatively coupled at any given time.

Figure 4:
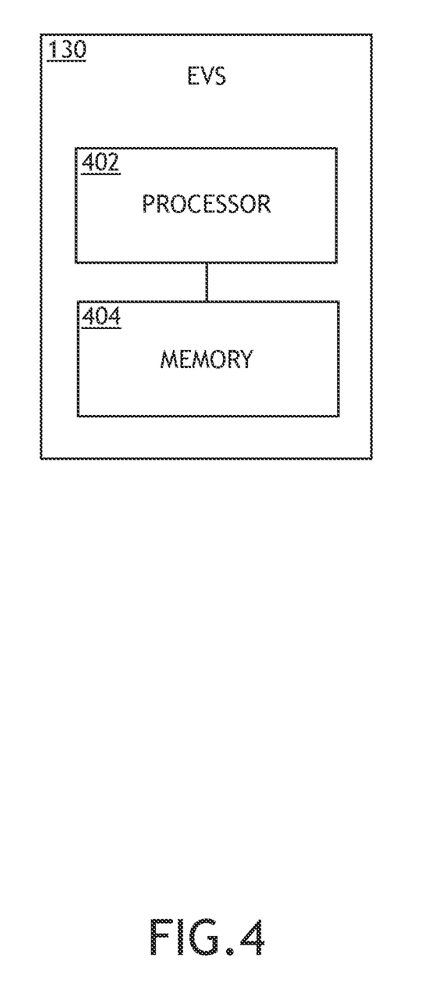
FIG. 4 is a view of the enhanced vision system of the system of FIG. 1 according to the inventive concepts disclosed herein.

The at least one processor 122 may be implemented as any suitable processor(s), such as at least one general purpose processor, at least one central processing unit (CPU), at least one image processor, at least one graphics processing unit (GPU), and/or at least one special purpose processor configured to execute instructions for performing (e.g., collectively performing if more than one processor) any or all of the operations disclosed throughout. For example, the processor 122 may be configured to: receive IMU data from the IMU 126 and/or IRS data from the IRS 128; receive EVS image data from the EVS 130 (which may include at least one processor 402 and at least one memory device 404 as shown in FIG. 4); and/or receive aircraft sensor data from the aircraft sensors 132; receive head and/or pose system tracking data; generate and/or output image data to the waveguide display 110 and/or to the optical system 112, for example, based on and/or the head and/or pose tracking system data; generate and/or output augmented reality and/or virtual reality image data to waveguide display 110 and/or the optical system 112, for example, based on and/or the head and/or pose tracking system data; and/or generate and/or output other image data, which may include vehicle operation (e.g., aircraft) information, symbology, navigation information, tactical information, and/or sensor information to the waveguide display 110 and/or the optical system 112, for example, based on the head and/or pose tracking system data.

For example, the processor 122 may be configured to: receive the monitored image data from each of the at least one image monitor sensor 115; and/or based at least on the monitored image data, determine whether the waveguide display 110 displayed the image correctly.

For example, the processor 122 may be configured to: obtain the image data corresponding to the image; compare the monitored image of each of the at least one image monitor sensor 115 against the image; and/or based at least on the comparison of the monitored image of each of the at least one image monitor sensor against the image, determine whether the given waveguide display 110 displayed the image correctly.

For example, the processor 122 may be configured to: based at least on the monitored image data, determine that the waveguide display 110 displayed the image incorrectly. For example, the processor 122 may be configured to: based at least on the monitored image data, determine that the waveguide display 110 displayed the image as a flipped image or a frozen image. For example, the processor 122 may be configured to: based at least on the monitored image data, determine that the waveguide display 110 displayed the image brighter than a predetermined maximum brightness threshold or less bright than a predetermined minimum brightness threshold. For example, the processor 122 may be configured to: based at least on the monitored image data, determine that the waveguide display 110 displayed the image with incorrectly positioned symbology, incorrect symbology, or missing symbology. For example, the processor 122 may be configured to: based at least on the monitored image data, determine that the waveguide display 110 displayed image content of the image incorrectly. For example, the processor 122 may be configured to: based at least on the determination that the waveguide display 110 displayed the image incorrectly, disable the given waveguide display 110. For example, the processor 122 may be configured to: determine whether at least one of the monitored image of each of the a least one image monitor sensor 115 is aligned with a field of view of the user.

For example, the processor 122 may be configured to: compare the monitored image data against the second waveguide monitored image; and based at least on the comparison of the monitored image data against the second waveguide monitored image data, determine whether one of the waveguide display 110 or the second waveguide display 110 displayed the image incorrectly.

Figure 3:
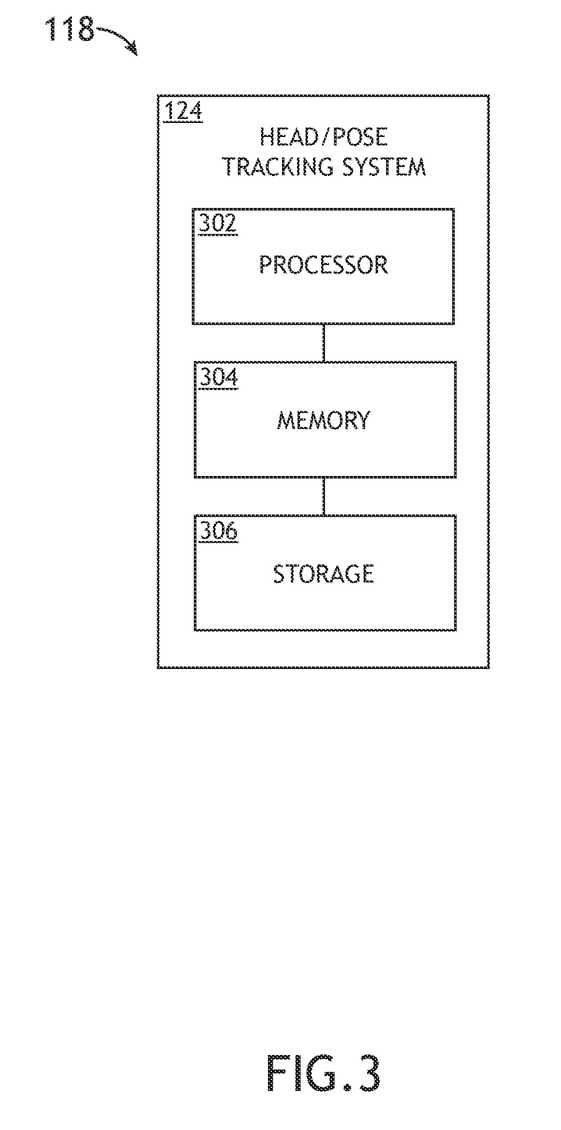
FIG. 3 is a view of the head and/or pose tracking system of the computing device of FIG. 1 according to the inventive concepts disclosed herein.

The head and/or pose tracking system 124 may have optical, magnetic, and/or inertial tracking capability. In some embodiments, the head and/or pose tracking system 124 may include head and/or pose tracking capabilities and/or be coordinated with head and/or pose tracking capabilities of another head and/or pose tracking system (e.g., 106), for example, such that the head and/or pose tracking operations are relative to a position and/or orientation of a user and/or relative to a position and/or orientation to a vehicle (e.g., the aircraft 102). For example, the head and/or pose tracking system 124 may be configured to track a direction of where a field of view (FOV) through the waveguide display 110 is pointing. For example, if the waveguide display 110 is mounted to the HWD device 104, this direction may be a direction that a head is pointing that is being tracked. The head and/or pose tracking system 106 may include at least one sensor (not shown), at least one processor 302, at least one memory 306, and/or at least one storage device 308, as well as other components, equipment, and/or devices commonly included in a head and/or pose tracking system, some or all of which may be communicatively coupled at any time, as shown in FIG. 3. The at least one processor 302 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout. The at least one sensor may be at least one optical sensor (e.g., an optical infrared sensor (e.g., an infrared camera) configured to detect infrared light emitted and/or reflected from the fiducials 202), at least one magnetic sensor, and/or at least one inertial sensor. The head and/or pose tracking system 124 may be configured to determine and track a position and an orientation of a user's head relative to an environment (e.g., a cockpit 200). The head and/or pose tracking system 106 may be configured for performing fully automatic head and/or pose tracking operations in real time. The processor 302 of the head and/or pose tracking system 124 may be configured to process data received from the sensors 204 and output processed data (e.g., head and/or pose tracking data) to one of the computing devices of the system 100 and/or the processor 108 for use in generating images aligned with the user's field of view, such as augmented reality or virtual reality images aligned with the user's field of view to be displayed by the waveguide display 110. For example, the processor 302 may be configured to determine and track a position and orientation of a user's head relative to an environment (e.g., a cockpit 200). The processor 302 may be configured to receive IMU data from the IMU 126 and/or IRS data from the IRS 128. Additionally, for example, the processor 302 may be configured to generate position and orientation data associated with such determined information and output the generated position and orientation data. The processor 302 may be configured to run various software applications or computer code stored in a non-transitory computer-readable medium (e.g., memory 304 and/or storage device 306) and configured to execute various instructions or operations. In some embodiments, the at least one processor 302 may be implemented as a special purpose processor configured to execute instructions for performing (e.g., collectively performing if more than one processor) any or all of the operations disclosed throughout.

In some embodiments, at least one processor (e.g., 108 and/or 122), each of the at least one processor (e.g., 108 and/or 122) implemented in the head wearable display device 104 or in a computing device 118 separate from the head wearable display device 104, wherein the at least one processor (e.g., 108 and/or 122) is configured (e.g., collectively configured to perform, if more than one processor) to any of the operations disclosed throughout. For example, the at least one processor may be at least two processors including at least one head wearable display device processor 108 and at least one at least one computing device processor 122 collectively configured to perform any or all of the operations disclosed throughout.

Figure 5:
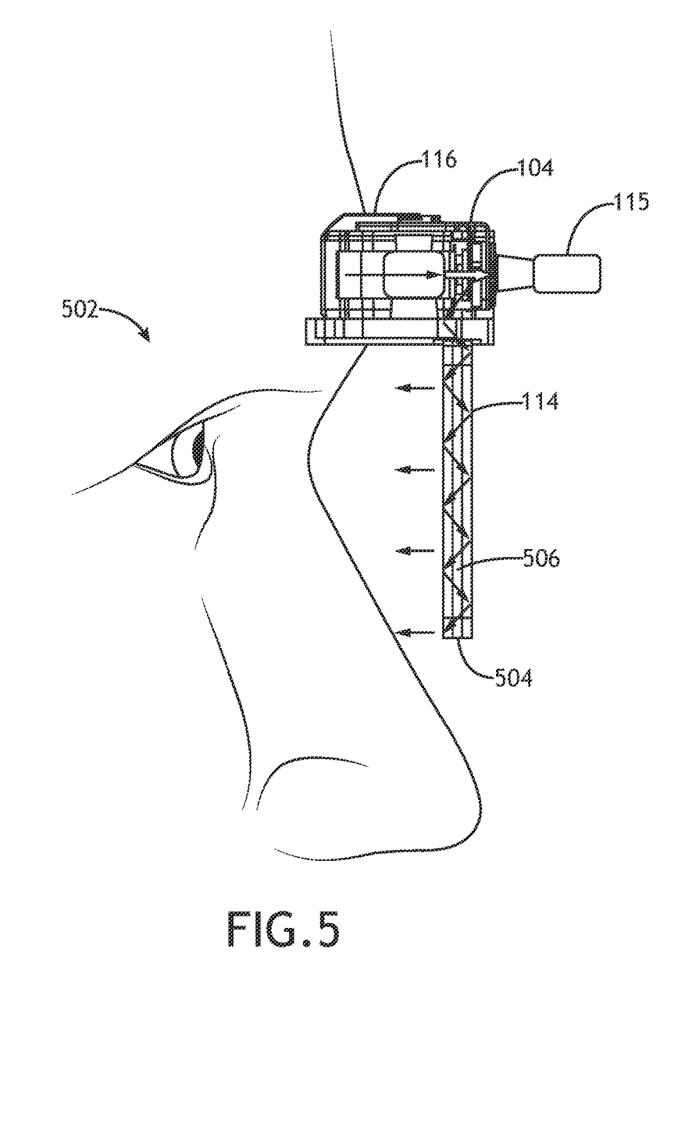
FIG. 5 is a view of an exemplary embodiment of the HWD device of FIG. 1 according to the inventive concepts disclosed herein.
Figure 6A:
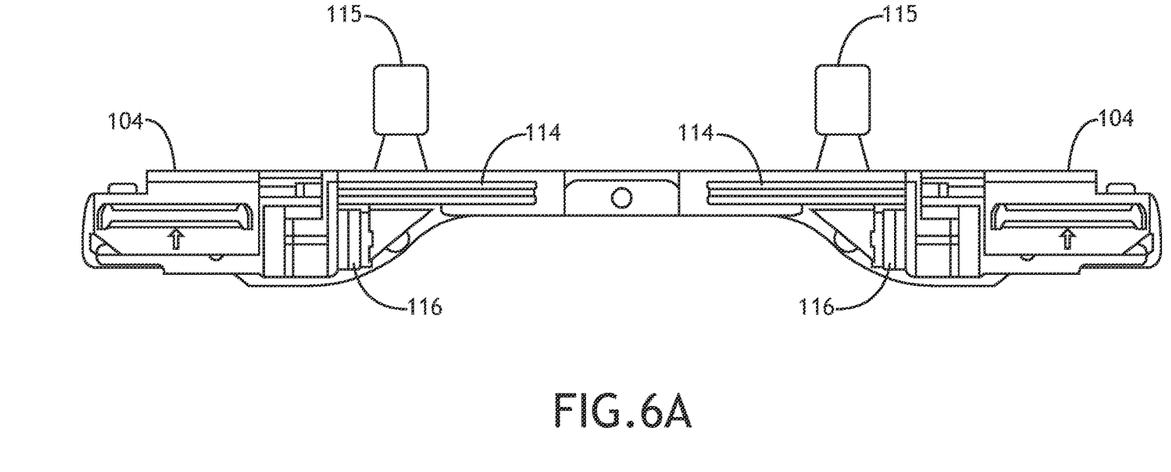
FIG. 6A is a view of an exemplary embodiment of the HWD device of FIG. 1 according to the inventive concepts disclosed herein.
Figure 6B:
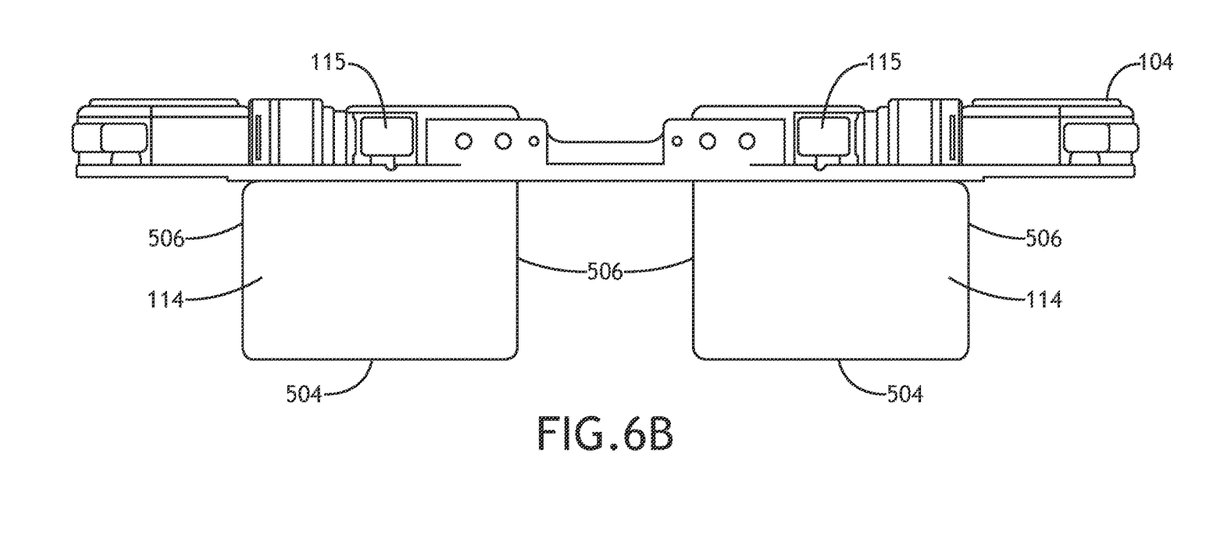
FIG. 6B is a view of an exemplary embodiment of the HWD device of FIG. 1 according to the inventive concepts disclosed herein.

Referring now to FIGS. 5, 6A, and 6B, an exemplary embodiment of a head wearable display device 104 of FIG. 1 worn by a user 502 (e.g., a pilot) according to the inventive concepts disclosed herein is depicted. FIG. 5 shows a side view of the head wearable display device 104. FIG. 6A shows a top view of the head wearable display device 104. FIG. 6B shows a front view of the head wearable display device 104. FIGS. 5, 6A, and 6B show two image monitor sensors 115, each optically coupled to the waveguide 114 at a position on the waveguide 114 above a user-viewable portion of the waveguide 114. Each image monitor sensor 115 is configured to capture at least the at least the portion of the image emitted from the position on the waveguide 114 above the user-viewable portion of the waveguide 114. Light from the optical system 112 may enters the waveguide 114 and is not fully captured within the waveguide 114, leaving a portion of the light to pass through the waveguide to be captured by the image monitor sensor 115.

Figure 8:
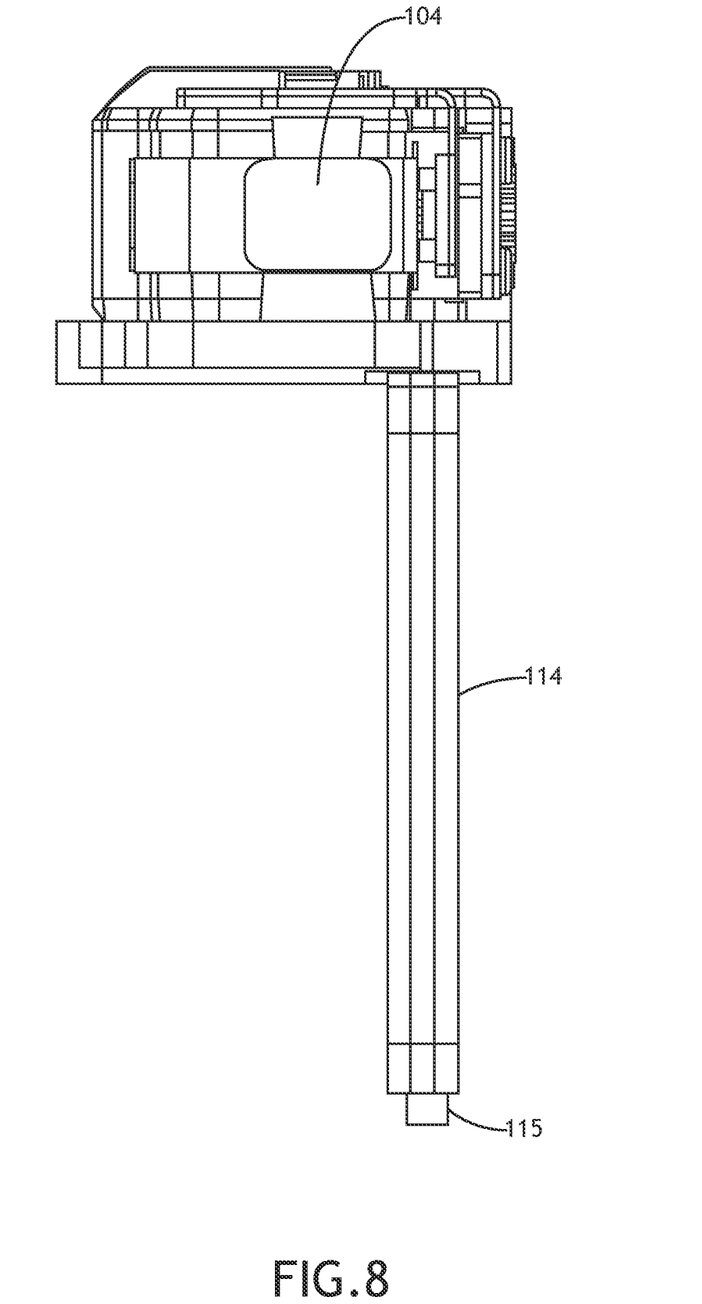
FIG. 8 is a view of an exemplary embodiment of the HWD device of FIG. 1 according to the inventive concepts disclosed herein.

Referring now to FIGS. 7 and 8, an exemplary embodiment of a head wearable display device 104 of FIG. 1 according to the inventive concepts disclosed herein is depicted. FIG. 7 shows a front perspective view of the head wearable display device 104. FIG. 8 shows a side view of the head wearable display device 104. FIGS. 7 and 8 show two image monitor sensors 115, with a first image monitor sensor 115 optically coupled to the waveguide 114 along a bottom edge 504 of the waveguide 114 and with the second image monitor sensor 115 optically coupled to the waveguide 114 along a side edge 506 of the waveguide 114. In some embodiments, the waveguide 114 may include output gratings 704 positioned at the edge of the waveguide 114 where the image monitor sensors 115 are located. In some embodiments, the side edge 506 and/or the bottom edge 504 of the waveguide 114 is polished in a small area where the image monitor sensor 115 is optically coupled to the waveguide 114 to view the image from the light that makes it to the bottom or side of the waveguide 114. The image may have chromatic aberration, but the overall structure of the image can be visualized, such as for the occurrence of an image that is frozen, flipped, rotated etc. In some embodiments, the edge of the waveguide where the image monitor sensor 115 is located may include a small output grating 704 between the image monitor sensor 115 and the polished edge so as to remove the chromatic aberration in the captured monitored image. The image monitor sensors 115 could be placed on both eyes' waveguides 114, in multiple locations and along the sides. The wires 702 for the camera can be routed around the frame of the waveguides 114 of the HWD device 104. With an image monitor sensor 115 on both eye systems, the monitored images captured can be compared to determine if one waveguide display 110 has an issue, as the probability of both having an issue at the same time would be very small.

In some embodiments, the image monitor sensors 115 can (1) capture a near 1:1 sample of the image FOV and resolution or, (2) perform a coarse system monitoring similar to a photodiode-type monitor employed in some HUD systems today that only views quadrants of the image to check for stuck/flipped image. For the first example (1), it enables the use of machine vision algorithms to extract specific symbols and their position on the waveguide display 110. In this embodiment, the captured HWD device 104 image can be compared against data from the HWD image generation system (e.g., computing device 118) to enable fully independent validation of the projected image. This allows the performance of most or all of the key display content monitoring likely required of a high integrity avionics display system to confirm appropriate image content, overall integrity, and commanded brightness. For the second example (2), it may be much simpler to implement as it could be realized with small photodiodes and a mask over the back side of input grating. The photodiodes in this embodiment could be paired with a brief subframe pulse of a different illumination color or near-infrared (NIR) frequency that is not efficiently coupled into the waveguide 114 and thus is imperceptible to a pilot.

In some embodiments, utilizing processing, the system can monitor for appropriate alignment of presented content with the real world, as well as erroneous masking of areas of the cockpit which should always remain visible to the pilot. In this case, the image monitor sensor data may be compared with other sources of truth to generate an independent and closed-loop feedback system. Video and inertial data from head tracker camera (e.g., sensor 204) and HWD device IMU together with aircraft-fixed video and inertial data from the platform IMU 126 and pilot monitoring camera is available as well as known fiducial locations and cockpit geometry. This information is used to determine the appropriate HWD image alignment in the system. By comparing the final as-presented image against an independently calculated assessment of proper alignment, a closed loop verification of system integrity can conceivably be performed. This method might be further used to optimize the alignment of the system in real-time or blank portions of the image as needed based on required visibility or erroneous behavior.

Figure 9:
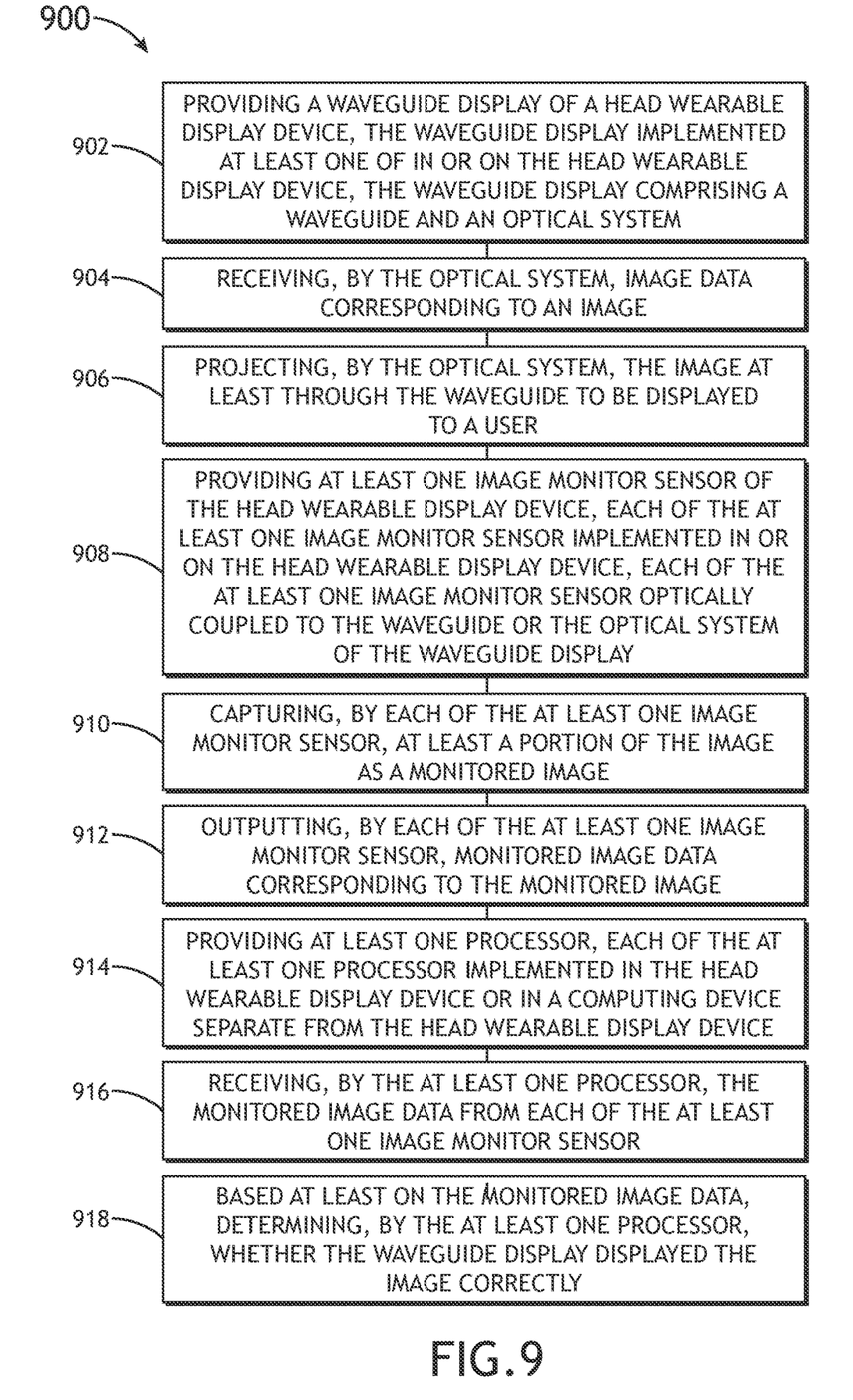
FIG. 9 is a diagram of an exemplary embodiment of a method according to the inventive concepts disclosed herein.

Referring now to FIG. 9, an exemplary embodiment of a method 900 according to the inventive concepts disclosed herein may include one or more of the following steps. Additionally, for example, some embodiments may include performing one more instances of the method 900 iteratively, concurrently, and/or sequentially. Additionally, for example, at least some of the steps of the method 900 may be performed in parallel and/or concurrently. Additionally, in some embodiments, at least some of the steps of the method 900 may be performed non-sequentially. Additionally, in some embodiments, at least some of the steps of the method 900 may be performed in sub-steps of providing various components.

A step 902 may include providing a waveguide display of a head wearable display device, the waveguide display implemented at least one of in or on the head wearable display device, the waveguide display comprising a waveguide and an optical system.

A step 904 may include receiving, by the optical system, image data corresponding to an image.

A step 906 may include projecting, by the optical system, the image at least through the waveguide to be displayed to a user.

A step 908 may include providing at least one image monitor sensor of the head wearable display device, each of the at least one image monitor sensor implemented in or on the head wearable display device, each of the at least one image monitor sensor optically coupled to the waveguide or the optical system of the waveguide display.

A step 910 may include capturing, by each of the at least one image monitor sensor, at least a portion of the image as a monitored image.

A step 912 may include outputting, by each of the at least one image monitor sensor, monitored image data corresponding to the monitored image.

A step 914 may include providing at least one processor, each of the at least one processor implemented in the head wearable display device or in a computing device separate from the head wearable display device.

A step 916 may include receiving, by the at least one processor, the monitored image data from each of the at least one image monitor sensor.

A step 918 may include based at least on the monitored image data, determining, by the at least one processor, whether the waveguide display displayed the image correctly.

Further, the method 900 may include any of the operations disclosed throughout.

As will be appreciated from the above, embodiments of the inventive concepts disclosed herein may be directed to a method and a system including a head wearable device having a waveguide display and an image monitor sensor (e.g., a camera or a photodiode).

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a head wearable display device, comprising:
a waveguide display implemented at least one of in or on the head wearable display device, the waveguide display comprising:
a waveguide; and
an optical system, the optical system configured to:
receive image data corresponding to an image; and
project the image at least through the waveguide to be displayed to a user; and
at least one image monitor sensor, each of the at least one image monitor sensor implemented in or on the head wearable display device, each of the at least one image monitor sensor optically coupled to the waveguide or the optical system of the waveguide display, each of the at least one image monitor sensor configured to:
capture at least a portion of the image as a monitored image; and
output monitored image data corresponding to the monitored image; and
at least one processor, each of the at least one processor implemented in the head wearable display device or in a computing device separate from the head wearable display device, wherein the at least one processor is configured to:
receive the monitored image data from each of the at least one image monitor sensor; and
based at least on the monitored image data, determine whether the waveguide display displayed the image correctly,
wherein the at least one image monitor sensor comprises a given image monitor sensor optically coupled to the waveguide at a position on the waveguide above a user-viewable portion of the waveguide,
wherein the given image monitor sensor is configured to capture at least the portion of the image emitted from the position on the waveguide above the user-viewable portion of the waveguide.

2. The system of claim 1, wherein the at least one processor is further configured to: obtain the image data corresponding to the image; compare the monitored image of each of the at least one image monitor sensor against the image; and based at least on the comparison of the monitored image of each of the at least one image monitor sensor against the image, determine whether the given waveguide display displayed the image correctly.

3. The system of claim 1, wherein the at least one processor is further configured to: based at least on the monitored image data, determine that the waveguide display displayed the image incorrectly.

4. The system of claim 3, wherein the at least one processor is further configured to: based at least on the monitored image data, determine that the waveguide display displayed the image as a flipped image or a frozen image.

5. The system of claim 3, wherein the at least one processor is further configured to: based at least on the monitored image data, determine that the waveguide display displayed the image brighter than a predetermined maximum brightness threshold or less bright than a predetermined minimum brightness threshold.

6. The system of claim 3, wherein the at least one processor is further configured to: based at least on the monitored image data, determine that the waveguide display displayed the image with incorrectly positioned symbology, incorrect symbology, or missing symbology.

7. The system of claim 3, wherein the at least one processor is further configured to: based at least on the monitored image data, determine that the waveguide display displayed image content of the image incorrectly.

8. The system of claim 3, wherein the at least one processor is further configured to: based at least on the determination that the waveguide display displayed the image incorrectly, disable the given waveguide display.

9. The system of claim 1, wherein the at least one processor is further configured to: determine whether at least one of the monitored image of each of the a least one image monitor sensor is aligned with a field of view of the user.

10. The system of claim 1, wherein the given image monitor sensor is optically coupled to the waveguide at a position along a side edge or a bottom edge of the waveguide.

11. The system of claim 10, wherein the waveguide includes an output grating between the given image monitor sensor and the side edge or the bottom edge of the waveguide to reduce chromatic aberration in the monitored image.

12. The system of claim 1, wherein the head wearable display device further comprises a second waveguide display, the second waveguide display comprising a second waveguide and a second optical system, wherein the second optical system is configured to: receive the image data corresponding to the image and project the image at least through the second waveguide to be displayed to the user.

13. The system of claim 12, wherein the waveguide display is one of a left eye waveguide display or a right eye waveguide display, wherein the second waveguide display is another of the left eye waveguide display or the right eye waveguide display.

14. The system of claim 13, wherein the head wearable display device further comprises at least one second image monitor sensor, each of the at least one second image monitor sensor optically coupled to the second waveguide or the second optical system of the second waveguide display, each of the at least one second image monitor sensor configured to: capture at least a portion of the image as a second waveguide monitored image and output second waveguide monitored image data corresponding to the second waveguide monitored image.

15. The system of claim 14, wherein the at least one processor is further configured to: compare the monitored image data against the second waveguide monitored image; and based at least on the comparison of the monitored image data against the second waveguide monitored image data, determine whether one of the waveguide display or the second waveguide display displayed the image incorrectly.

16. The system of claim 1, wherein the at least one image monitor sensor comprises two image monitor sensors, wherein each of the two image monitor sensors are positioned at different locations on the waveguide, wherein each of the two image monitor sensors are configured to capture different portions of the image.

17. The system of claim 1, further comprising the computing device comprising at least one computing device processor, wherein the head wearable display device comprises at least one head wearable display device processor, wherein the at least one processor is at least two processors, wherein the at least two processors comprise the at least one computing device processor and the at least one head wearable display device processor.

18. The system of claim 1, further comprising an aircraft cockpit, wherein the head wearable display device is in the aircraft cockpit.

19. A method, comprising:
  providing a waveguide display of a head wearable display device, the waveguide display implemented at least one of in or on the head wearable display device, the waveguide display comprising a waveguide and an optical system;
  receiving, by the optical system, image data corresponding to an image;
  projecting, by the optical system, the image at least through the waveguide to be displayed to a user;
  providing at least one image monitor sensor of the head wearable display device, each of the at least one image monitor sensor implemented in or on the head wearable display device, each of the at least one image monitor sensor optically coupled to the waveguide or the optical system of the waveguide display, each of the at least one image monitor sensor comprises a given image monitor sensor optically coupled to the waveguide at a position on the waveguide above a user-viewable portion of the waveguide and configured to capture at least the portion of the image emitted from the position on the waveguide above the user-viewable portion of the waveguide;
  capturing, by each of the at least one image monitor sensor, at least a portion of the image as a monitored image;
  outputting, by each of the at least one image monitor sensor, monitored image data corresponding to the monitored image;
  providing at least one processor, each of the at least one processor implemented in the head wearable display device or in a computing device separate from the head wearable display device;
  receiving, by the at least one processor, the monitored image data from each of the at least one image monitor sensor; and
  based at least on the monitored image data, determining, by the at least one processor, whether the waveguide display displayed the image correctly.

20. A system, comprising:
  a head wearable display device, comprising:
    a first waveguide display implemented at least one of in or on the head wearable display device, the first waveguide display comprising:
      a first waveguide; and
      a first optical system, the first optical system configured to:
  receive image data corresponding to an image; and
  project the image at least through the first waveguide to be displayed to a user;
    a second waveguide display, the second waveguide display comprising:
      a second waveguide; and
      a second optical system, wherein the second optical system is configured to:
        receive the image data corresponding to the image and project the image at least through the second waveguide to be displayed to the user;
    wherein the first waveguide display is one of a left eye waveguide display or a right eye waveguide display, wherein the second waveguide display is another of the left eye waveguide display or the right eye waveguide display;
    at least one first image monitor sensor, each of the at least one first image monitor sensor implemented in or on the head wearable display device, each of the at least one first image monitor sensor optically coupled to the first waveguide or the first optical system of the first waveguide display, each of the at least one first image monitor sensor configured to:
      capture at least a portion of the image as a monitored image; and
      output monitored image data corresponding to the monitored image; and
    at least one second image monitor sensor, each of the at least one second image monitor sensor optically coupled to the second waveguide or the second optical system of the second waveguide display, each of the at least one second image monitor sensor configured to:
      capture at least a portion of the image as a second waveguide monitored image and output second waveguide monitored image data corresponding to the second waveguide monitored image;
  at least one processor, each of the at least one processor implemented in the head wearable display device or in a computing device separate from the head wearable display device, wherein the at least one processor is configured to:
    receive the monitored image data from each of the at least one first image monitor sensor or the at least one second image monitor sensor;
    based at least on the monitored image data, determine whether the first waveguide display displayed the image correctly;
    compare the monitored image data against the second waveguide monitored image; and based at least on the comparison of the monitored image data against the second waveguide monitored image data, determine whether one of the first waveguide display or the second waveguide display displayed the image incorrectly.

* * * * *